United States Patent
Kuznia et al.

(10) Patent No.: US 9,429,496 B2
(45) Date of Patent: Aug. 30, 2016

(54) OPTICAL TIME DOMAIN REFLECTOMETER IN A SMALL FORM FACTOR PACKAGE

(71) Applicant: ULTRA COMMUNICATIONS, INC., Vista, CA (US)

(72) Inventors: Charles B. Kuznia, Encinitas, CA (US); Richard J. Pommer, Carlsbad, CA (US); Joseph F. Ahadian, San Marcos, CA (US); Richard T. Hagan, Mission Viejo, CA (US)

(73) Assignee: ULTRA COMMUNICATIONS, INC., Vista, CA (US)

( * ) Notice: Subject to any disclaimer, the term of this patent is extended or adjusted under 35 U.S.C. 154(b) by 0 days.

(21) Appl. No.: 14/391,702

(22) PCT Filed: Apr. 11, 2013

(86) PCT No.: PCT/US2013/036118
§ 371 (c)(1),
(2) Date: Oct. 9, 2014

(87) PCT Pub. No.: WO2013/162903
PCT Pub. Date: Oct. 31, 2013

(65) Prior Publication Data
US 2015/0323420 A1     Nov. 12, 2015

Related U.S. Application Data

(60) Provisional application No. 61/623,058, filed on Apr. 11, 2012.

(51) Int. Cl.
*G01M 11/00* (2006.01)

(52) U.S. Cl.
CPC ..... *G01M 11/3154* (2013.01); *G01M 11/3136* (2013.01); *G01M 11/3145* (2013.01)

(58) Field of Classification Search
None
See application file for complete search history.

(56) References Cited

U.S. PATENT DOCUMENTS

| | | | | |
|---|---|---|---|---|
| 6,519,026 B1* | 2/2003 | Holland | ............. | G01M 11/3109 356/73.1 |
| 7,593,098 B2* | 9/2009 | Brendel | ............. | G01M 11/3145 356/73.1 |
| 8,335,411 B2* | 12/2012 | Kuznia | ................ | G02B 6/4214 385/14 |
| 9,036,991 B2* | 5/2015 | Aguren | .............. | G01M 11/3154 398/21 |
| 9,143,228 B2* | 9/2015 | Sandstrom | ........... | H04B 10/071 |
| 2007/0036493 A1* | 2/2007 | Brenner | ............... | G02B 6/4246 385/89 |
| 2008/0101752 A1* | 5/2008 | Chan | ................... | G01M 11/3136 385/89 |

FOREIGN PATENT DOCUMENTS

WO     WO 2011123687 A1 *     10/2011

OTHER PUBLICATIONS

Ahadian, J., et al., "Bit-enabled VCSEL-based parallel optic transceivers," Sep. 2012, Avionics, Fiber-Optics and Photonics Technology Conference (AVFOP), pp. 32-33.*

* cited by examiner

*Primary Examiner* — Gordon J Stock, Jr.
(74) *Attorney, Agent, or Firm* — Jonathan A. Kidney; TechLaw LLP

(57) ABSTRACT

A system for creating an optical time domain reflectometer (OTDR) in a small package is described. This system allows the implementation of multiple channels of OTDR in package of similar size to existing fiber optic transceivers.

22 Claims, 4 Drawing Sheets

OPTICAL TIME DOMAIN REFLECTOMETER IN A SMALL FORM FACTOR PACKAGE

CROSS-REFERENCE TO RELATED APPLICATION(S)

This application claims the benefit of international application no. PCT/US13/36118 filed Apr. 11, 2013 claiming priority to U.S. Provisional Patent Application No. 61/623,058 filed Apr. 11, 2012, titled "OPTICAL TIME DOMAIN REFLECTOMETER IN A SMALL FORM FACTOR PACKAGE," the contents of which are hereby incorporated by reference in their entirety.

FEDERALLY-SPONSORED RESEARCH AND DEVELOPMENT

This invention was made with Government support under contract no. N68335-09-C-0104 awarded by the United States Navy. The government may have certain rights.

BACKGROUND

1. Field

This invention relates to devices that communicate over fiber optic waveguides. More particularly, it relates to the realization of optical time domain reflectometer (OTDR) functionality within such devices.

2. Background

Fiber optics offers high data rate, low weight and electromagnetic interference immunity for data communications, making it suitable for use in modern aircraft, helicopters, unmanned avionic vehicles, space-craft and missiles. These platforms require sensor and control data to be distributed throughout the system. Fiber optic components must be able to operate and survive in this environment. Fiber optic components must be made in compact packages to fit within strictly defined physical envelopes.

Fiber optic components in this environment may become damaged. Component can be constructed with a 'fixed pigtail', a short run of fiber that is permanently attached to the component. Often, components designed for harsh environments have a fixed pigtail that passes through a hermetically sealed can. The electronic and optoelectronic (OE) devices (e.g., PIN detectors, lasers, and LEDs) are contained inside the sealed can.

The process of making a hermetic pass-thru of the fiber is expensive, consumes considerable package volume, and is not compatible with re-work. Some fiber components use a ribbon made up of multiple fibers (typically 12). The process sealing the ribbon fiber feed-thru is much more difficult and expensive than a single fiber.

Also, optical fiber optic connectors are typically not compatible with a solder reflow process. Therefore, if another component on a printed wiring board needs to be replaced, the fiber optic component must be removed prior to solder re-work. This additional handling of the fiber optic component also exposes the fiber pigtail to damage.

Further, maintaining the alignment of OE devices, lenses and the optical fiber in a non-temperature controlled environment is challenging. The OE devices are typically formed in an III-V material with a coefficient of thermal expansion (CTE) below 6 ppm/C, while the lenses that couple light between the OE devices and fibers are typically molded in a plastic material with a CTE above 30 ppm/C. This large difference in CTE causes issues of maintaining alignment over temperature.

Accordingly, there are multiple areas of difficulty in the fiber optical component industry. In view of above and other challenges in the industry, methods and systems are described below that provide, among other things, precision alignment, low-cost fiber optic modules, an optical path that can be sealed from contamination, and a pigtail that can be connectorized or replaced with a simple process.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, an optical time domain reflectometer (OTDR) device is provided, comprising: a connector guide configured to mate to an attachable fiber optic connector; a beam splitter disposed within the connector guide; a lens seal coupled to a bottom portion of the connector guide; a collimating lens in alignment with the beam splitter and sealed to a bottom portion of the lens seal to prevent external contamination from gases and liquids; a transparent carrier coupled to a bottom portion of the collimating lens, wherein the transparent carrier has electrical pathways; an optical transmitter and optical receiver in alignment with the collimating lens and mounted to an underside of the transparent carrier and connected to the electrical pathways; and a transmitting and receiving circuit mounted to the underside of the transparent carrier and connected to the electrical pathways, a transmitting portion configured to send a signal to the optical transmitter to cause the optical transmitter to send a pulse of light into an optical fiber of the attachable fiber optic connector, and a receiving portion configured to receive a signal from the optical receiver, from a received pulse of light from the optical fiber of the attachable fiber optic connector; wherein a time domain reflectometry measurement is determined from a time difference between a sent and received signal.

In other aspects of some of the disclosed embodiments, the time domain reflectometry measurement is for a plurality of fibers in the attachable fiber optic connector; and/or the transmitting and receiving circuit further comprises an OTDR timing circuit; and/or the transmitting and receiving circuit comprises a clock circuit, a pattern generator and delay circuit, sampling receiver circuit, and a optical transmitter compatible signal driver; and/or the sampling receiver circuit is configured to take two samples, one sample accounting for system noise; and/or at least one of the transmitting and receiving circuit, and the OTDR timing circuit is an application specific integrated circuit (ASIC); and/or the transmitting and receiving circuit comprises a timing control ASIC and a transceiver ASIC; and/or the beam splitter is configured with at least one of a first partially reflective surface of approximately 45 degrees and a second surface that is approximately 100% reflective; and/or the transparent carrier is mounted to a substrate having a plurality of electrical wiring, and a portion of the transparent carrier's electrical pathways are in communication with the substrate's electrical wiring; and/or the substrate is a ceramic carrier substrate; and/or the transmitting and receiving circuit is flip-chip bonded to the transparent carrier; and/or the transparent substrate is flip-chip bonded to the substrate; and/or the transparent carrier and lens seal are flip-chip bonded to each other; and/or the optical receiver comprises a OTDR receiver and a standard optical receiver; and/or the optical receiver is a PIN diode, and the optical transmitter is at least one of a diode laser, diode LED and modulated laser; and/or the optical receiver and optical transmitter are aligned to a desired position on the transparent substrate within a precision of less than 3 microns; and/or an overall height of the device is less than 10 mm; and/or the beam splitter, lens seal, collimating lens, transparent carrier, and at least one of the optical transmitter and optical receiver have a matching coefficient of thermal expansion of less than +/−5 ppm/C. deg.

In yet another aspect of the disclosed embodiments, a method of performing optical time domain reflectometry is provided, comprising: generating a clocking signal via a first integrated circuit bonded to an a transparent substrate; generating a pulse pattern via a second integrated circuit bonded to the transparent substrate; transmitting the pulse pattern to a driver bonded to the transparent substrate; exciting an optical transmitter bonded to the transparent substrate with the pulse pattern from the driver, to emit light pulses into a bi-directional coupler that is couples light into a first fiber and couples light from the fiber into a second fiber; detecting via an optical receiver bonded to the transparent substrate, a received light from the second fiber; and sampling the received light and measuring a time difference, via a timing circuit bonded to the transparent substrate, between a sent and received light, to determine a time domain reflectometry measurement.

In other aspects of some of the disclosed embodiments, the first integrated circuit, second integrated circuit, driver, optical transmitter, optical receiver, and timing circuit are bonded to the transparent substrate via a flip-chip bonding process; and/or the sampling is performed at least two times, wherein one sample determines a baseline measurement of system noise.

DETAILED DESCRIPTION

Figure 1:
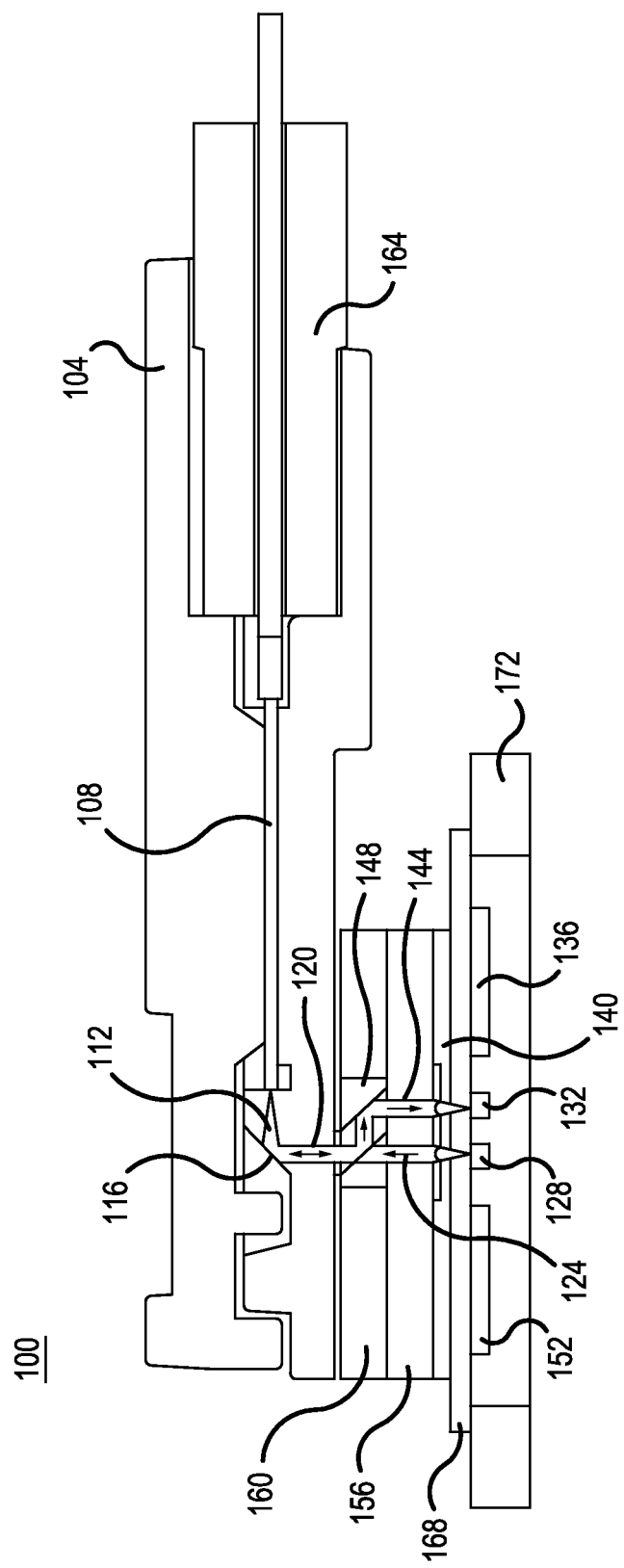
FIG. 1 shows a side-view of an example a transceiver with integrated OTDR capability.

Several obstacles are encountered when working with fiber optic devices. For example, fiber optic strands are lightweight, but they are also fragile. The pigtail can be damaged in the process of manufacturing the component, in the process of fielding the component and in the process of operating the component in the field. If the fiber pigtail is damaged the fiber can be cut and re-connectorized, or in some cases it can be 'fused' back together. This is a process that requires the component to be removed from the system and the repair work is done a specialized facility. This process is only possible if the damage to the fiber is some distance from the component. It is not possible to fix damage that occurs near the components, since some run of fiber must be available for re-connectorizing and/or fusing. In many cases the fiber cannot be repaired and the entire fiber optic component must be replaced.

A system of providing a fiber optic interface that can be easily re-worked or connectorized would avoid the cost and inconvenience of fiber pigtail damage. Ideally, the pigtail could be easily attached and removed from the fiber optic component. The process of attaching and removing the pigtail should not disrupt the hermetic seal of the electronic and OE devices.

Also, maintaining the alignment of OE devices, lenses and the optical fiber in a non-temperature controlled environment is challenging. One method of accommodating the CTE mis-match is to use a two lens approach: one lens fabricated in material close to CTE of the OE devices and precisely aligned to the OE device, and a second lens fabricated in a material close to the CTE of the material holding the fiber and precisely aligned to the fiber. The same material can be used to hold the fiber and form the lens. This lens system forms a 'collimated' or 'expanded' beam interface that is tolerant to misalignment.

However, the alignment problem is more severe in fiber optic components that utilize multiple, parallel channels as the OE devices are formed as an array. The lens system must couple an array of OE devices to an array of fibers, using an array of lenses. Maintaining alignment of these arrays of devices is more difficult than in single channel fiber optic components.

With respect to the measurement of optical fibers, OTDR is a well known method of finding the location of discontinuities within the length of an optical waveguide. If a portion of a waveguide is damaged or broken, this section will reflect a portion of the light back to the light source. An OTDR system typically operates by transmitting a short pulse of light down the waveguide and measuring the time delay of the light pulse reflected from the discontinuity. The time delay is proportional to the distance traveled within the waveguide and thereby the location of the discontinuity is determined.

OTDR is performed today with a specialized piece of test equipment. To perform OTDR, the user disconnects one end of the optical link (either on the transmitter or receiver end) and inserts the test equipment. The OTDR test equipment then indicates the locations of discontinuities in the fiber path. Since fiber optical connections have traditionally been implemented for long distance communications, OTDR equipment is designed to measure lengths of fiber of 1000 meters or more. These applications are sometimes called fiber to the home, wide area networks or local area networks. Over these long spans, the acceptable accuracy of OTDR equipment, in terms of resolving the location of a fiber discontinuity, is not less than 1 meter.

Rather than use a specialized piece of test equipment, a proposed method of performing OTDR is to implement the function within the optical transmitter within the local devices. This would allow automated testing of the fiber link for discontinuities without disconnecting the link. This is highly desirable for fiber optic networks that have the transmitters and receivers in locations that are not easily accessible by a technician with OTDR test equipment. For example, military aircraft can have tens to hundreds of fiber links that move data among sensors, displays and data processing units. The optical transmitters and receivers are located within boxes that are distributed across the airframe. Due to tight physical space requirements, the boxes are packaged in remote, hard to reach locations. In this application, an optical transmitter with the capability to autonomously perform OTDR would be a great benefit to maintainers of the aircraft.

With respect to the optical waveguides—parallel fiber optic components operate on multiple individual fibers in parallel, and each individual fiber is susceptible to a discontinuity. Parallel optic transmitters and transceivers transmit data over these multiple fibers connected into a single package. A transmitter or transceiver with an OTDR function embedded on each fiber channel would allow measurement of each of the individual fibers in the link.

Commercial telecom components in hermetically sealed cans do not meet the size requirements, are expensive (due to low yield), and cannot be connectorized (i.e., components are delivered with a fragile fiber pigtail). In contrast, commercial datacom components (used for links less than 300 meters) are well suited for aerospace applications, but are not presently qualified for harsh environments. Datacom components can be packaged within small, ruggedized packages with connectorized pigtails. They achieve the same performance requirements over a wide temperature range, and at a fraction of the power consumption and price tag.

What is proposed is a military grade, compact, rugged fiber optic product line using selective manufacturing practices with sub-components found in the commercial datacom industry. A manufacturing process using flip-chip bonding techniques can perform the key optical alignment steps.

For example, a flip-chip bonder with sub-micron placement accuracy can be used for the following assembly steps: 1) Laser and PIN array bonding to a transparent carrier, 2) transparent carrier bonding to a ceramic carrier substrate, and 3) lens bonding to the transparent carrier.

Using the above example as one possible approach, an optical interconnect system, the assembly method of utilizing precision aligned sub-components to build robust, low-cost fiber optic modules are described below. This system creates fiber optic modules that can have an optical path that can be sealed from contamination and a pigtail that can be connectorized or replaced with a simple process. This system can use an optical core (CORE) sub-assembly designed for high-reliability applications. The CORE contains the precision alignment and assembly of OE devices, integrated circuitry and lens devices onto a carrier containing wirebond pads or other standard electrical interface. The CORE eases assembly requirements for incorporation into a fiber optic module by providing a wire-bondable electrical interface and an optical interface with relaxed alignment tolerances.

The integrated circuitry can comprise a transceiver (containing laser drivers or receivers) and circuitry for performing OTDR. The fiber optic module can be manufactured using a flow that comprises five main steps: 1) CORE (OE device, transparent substrate and lens, beamsplitter, and optionally an interposer) assembly—using precision flip-chip bonding steps (makes the critical alignment of the OE devices to lenses), 2) module substrate assembly, populating a substrate with passive and/or active electrical components, lead frame interconnect and mechanical structures for supporting a lid, 3) module assembly, wire-bonding (or ribbon bonding or flip-chip attach) of the optical core into the substrate, and 4) attaching a top cable assembly (the top cable assembly contains lenses precisely aligned the fibers and a method for turning the light approximately 90 degrees).

This splits the manufacturing into two areas that can be distinguished by the assembly tolerances. The creation of the CORE and a top cable assembly requires tight (<10 micron) alignment of components (described in Steps #1 and #5). The remaining steps have relatively loose tolerances (>10 microns, including the attachment of the fiber cable assembly to the CORE.

This system also can contain alignment marks on a transparent substrate to allow passive alignment of the lasers (including vertical cavity surface emitting lasers—VCSELs) to the transparent substrate. A precision of less than 3 microns can be achieved. This system may contain alignment marks on the transparent substrate for lens alignment, to also achieve precision of less than 3 microns.

The top cable assembly can be held in place with an epoxy. This can be a semi-permanent attachment, allowing the top cable assembly to be replaced if necessary. The top cable assembly can be held in place with a connector mechanism. The connector mechanism can apply a spring load to hold the lens in place during operation in an environment with vibration, shock and thermal excursions. The spring load can be supplied with a spring supported by a frame, which in turn is attached to the base of the module (either a printed wiring board or ceramic substrate). The spring could also be supported by the metal can This system can create an optical module with less than 10 mm of overall height.

This system can create an optical module that would operate in a wide temperature range, −55 deg. C. to 100 deg. C. The CORE can be configured to have a 'delta-T' (temperature difference between the laser and case) of less than 10 deg. C. One embodiment of the system would allow operation up to 125 deg. C. by incorporating an active cooling element on the laser device The optical path within the system can be sealed from contamination. The optical path within the fiber connector can be interior to the fiber connector material. If a region of the material is use for creating reflections of the light within the material, these regions can be coated with a barrier material, such as a reflective metal, to prevent contamination from affecting the optical path. Lenses within the system can be formed within air cavity sealed by adhesive, solder or ionic bonded joints. The interface between the fiber connector and CORE can use a compliant and transparent material to seal the optical path.

The two part lens can have features at a 'parting interface' to aid in bringing the two lenses into alignment. The light signals are collimated (approximately a column of light, neither diverging nor converging) at the parting interface. This relaxes the alignment in the axis that the light is traveling, accommodating for distances up to 10 mm between these parting surfaces. This allows for transparent substrates, planar on both sides, to be inserted between the two lenses. Also, mechanical alignment features can be formed on the two lenses to bring the two lenses into alignment when mated.

An optical beamsplitter can operate on collimated light beams by re-directing a portion of the light. The beamsplitter can be used to create bi-directional coupling to a fiber, allowing a transceiver to both transmit light into a fiber and receive light back from the same fiber. Bi-directional coupling is used in OTDR when transmitting an optical pulse into a fiber and measuring the round-trip time-of-flight from reflections in the fiber.

The materials used in the CORE (laser, transparent carrier, lens, beamsplitter and optional interposer) and metal can (or optional support frames and windows) can be chosen to have a matching CTE (within +/−5 ppm/C). Example materials are GaAs, sapphire, ceramic (including low-temperature co-fired ceramic—LTCC), BK-7, ZnSe, and Kovar.

A module constructed of these materials would have minimal stresses on the seals in all dimensions (X, Y, and Z), including any stress imparted by the CORE structure in contact with the window (above) and floor of the module (either a ceramic substrate, metal can floor or combination of the two).

FIG. 1 is an illustration of a cross-sectional view 100 of an embodiment of a transceiver with OTDR functionality. An OTDR ASIC 136 sends an electrical pulse to a transceiver ASIC 152. The transceiver ASIC 152 converts the electrical pulse into a electrical pulse with electrical characteristics compatible or matches with a light emitter 128. The light from the light emitter 128 is collimated by a collimating lens 140 to create a transmit collimated light path 124. This light partially passes through a beamsplitter 148 and through a bidirectional light path 120 to a collimating surface 116 on a fiber connector 104. The collimating surface 116 focuses the light through a focusing and into a fiber 108 in fiber connector 104, having a strain/cable fixture 164 for attachment to the fiber connector 104.

This fiber 108 may have features that will reflect light back to towards the collimating surface 116 and will partially reflect downward to beamsplitter 148 and be directed to light path 144 of the "other" lens of collimating lens 140 and focus into a light detector 132. The signal from the light detector 132 enters the OTDR ASIC 136 (or to any other device connected to light detector 132).

The OTDR ASIC 136, transceiver ASIC 152, light emitter 128, or light detector 132 can be mounted on a transparent substrate 168 containing electrical wiring to facilitate their alignment and packaging. The collimating lens 140 can be aligned and bonded to the transparent substrate 168. A lens seal 156 can seal optical cavities on the collimating lens 140, using an adhesive, solder weld or with ionic bonding of the lens seal 156 to the collimating lens 140.

A fiber connector guide 160 may be aligned and bonded to the lens seal 156 or to the collimating lens 140. The fiber connector guide 160 can have mechanical features for alignment and mating to the fiber connector 104. The fiber connector guide 160 may have a cavity to contain a beamsplitter 148. The cavity is formed with sufficient accuracy to align the beamsplitter 148 to the collimating lens 140. The beamsplitter 148 may be formed with a partially reflective surface at an angle of approximately 45 degrees. For example, approximately 50% of the light may be passed through the beam splitter 148 and approximately 50% of the light may be reflected orthogonally. The beamsplitter 148 may have a second surface that may reflect approximately 100% of the light. The $1^{st}$ and $2^{nd}$ reflective surfaces are approximately parallel to one another. The beam splitter 148 may be formed in a glass material. The reflective surfaces may be formed with metal coatings, dielectric coatings or other optical coatings that allow for partial reflectivity.

Figure 2:
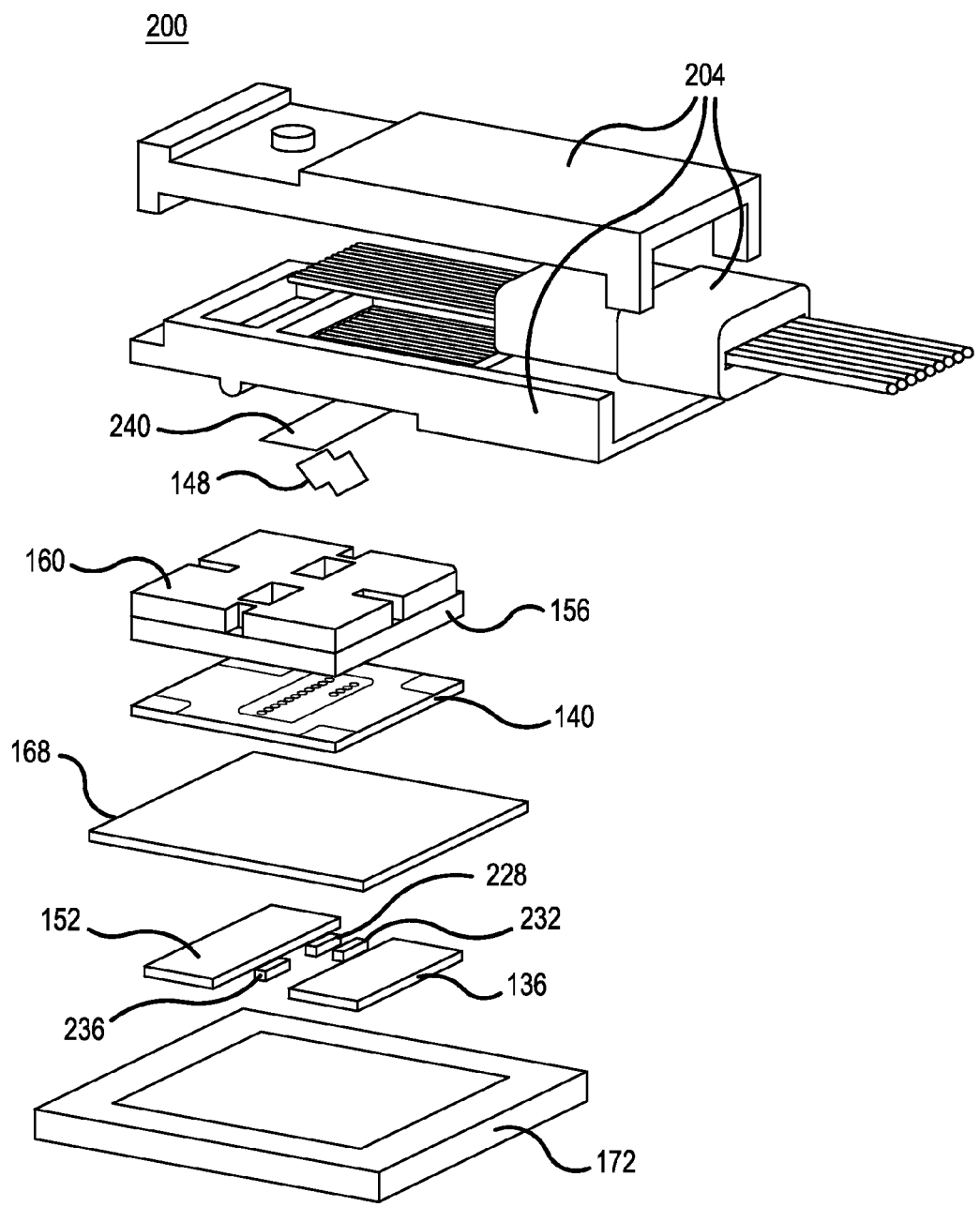
FIG. 2 shows an expanded-view of an example a transceiver with integrated OTDR capability having multiple fibers and a receiver section.

FIG. 2 shows an expanded-view 200 of an embodiment of a transceiver with integrated OTDR capability having multiple fibers and a receiver section. A transparent carrier 168 operates as a primary substrate for mounting electrical/optical devices and contains electrical wiring to support electrical communications between a transceiver ASIC 152, OTDR ASIC 136, light emitter chip 228 and light detector chip 232. There may be two light detector chips 232, 236, one used for OTDR and another used to as a standard receiver. The transparent carrier 168 may have alignment features to align the light emitter chip 228 and the light detector chip(s) 232 to the collimating lenses 140. The transparent carrier 168 may be in electrical communications with an electrical substrate 172. A lens seal 156 may be used to seal the lenses on the collimating lens 140. A fiber connector guide 160 may be bonded to the lens seal 156 or to the collimating lens 140. The connector guide 160 may have alignment features to aid in alignment to the collimating lens 140. The connector guide 160 may have features for aligning and mating to a fiber connector assembly 204. The connector guide 160 may have a cavity (e.g., optical port) to contain a beamsplitter 148. An optical gasket 240 may be present between the fiber connector guide 160 and fiber connector assembly 204, so that the optical path is fully contained within materials having similar indexes of refraction (reducing Fresnel reflections). The optical gasket 240 can provide protection from contamination. The optical gasket 240 can be formed in transparent compliant material such as silicone.

The electrical substrate 172, transceiver ASIC 152, OTDR ASIC 136, light emitter chip 228, light detector chip(s) 232, transparent carrier 168, collimating lens 140, lens seal 156, and fiber connector guide 160 can be assembled into a single component, called a CORE. The list above could be used to create CORE for a transceiver (having one or more transmit and receive channels) with OTDR functionality. However, not all of sub-components are required to make a CORE. The CORE can be assembled using a flip-chip bonder for some or all steps of assembly. The flip-chip bonder can achieve precision alignment (<1 microns) of two objects and bond them together. The bonding can be performed by a metal-to-metal joint, a solder joint, or adhesively.

Figure 3:
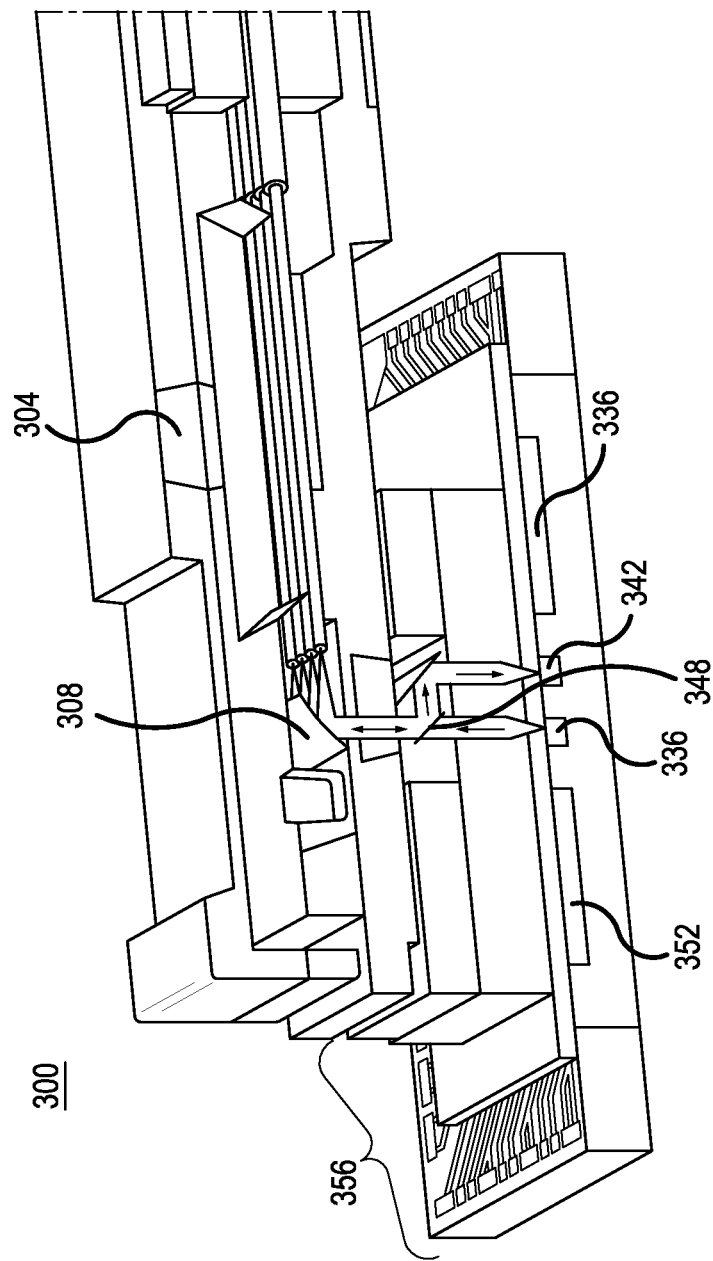
FIG. 3 shows a side-view of an example a transceiver with integrated OTDR capability having multiple fibers.

FIG. 3 shows a side-view 300 of an embodiment of a transceiver with integrated OTDR capability having multiple fibers. This embodiment has a CORE 356 mated to a fiber connector 304. A light emitter chip 336 produces a collimated light beam that strikes a beamsplitter 348. The beamsplitter 348 partially passes light through to the collimating surface 308 and into a fiber within the fiber connector 304. Light reflected back from features (e.g., discontinuities) in the fiber strikes the collimating surface 308 on the return path. The light continues from the collimating surface 308 to the beamsplitter 348. The beamsplitter 348 directs a partial amount of the light to lens that focuses the light into a light detector chip 342. A transceiver ASIC 352 is in electrical communications with the light emitter chip 336. The OTDR ASIC 336 is in electrical communications with the transceiver ASIC 352 and light detector chip 342.

Figure 4:
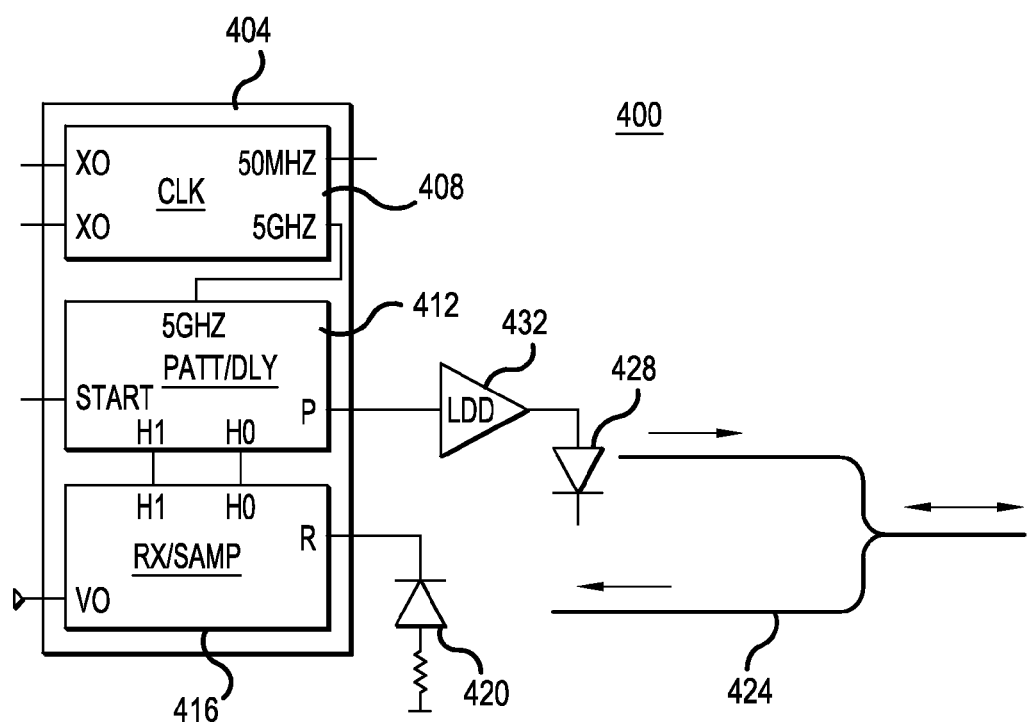
FIG. 4 shows a block diagram of an OTDR system using an OTDR application specific integrated circuit (ASIC).

FIG. 4 shows a block diagram 400 of an embodiment of an OTDR system using an OTDR ASIC. An OTDR system can be created with an OTDR ASIC 404 that contains a clock circuit 408, pattern generator and delay 412 and sampling receiver 416. The integration of these blocks allows for low cost and precision timing of high speed signals (such as short pulses for high resolution OTDR measurements). The clock circuit 408 can create a clock frequency that is adjustable. The clock circuit 408 is connected to the pattern generator and delay 412 circuit. The pattern generator and delay 412 creates the pulse pattern that is transmitted to the driver 432. The driver 432 converts the electrical signal from the OTDR ASIC 404 into an electrical signal format compatible or matches the light source 428. The light source 428 can be a diode laser, diode LED, or a modulator device (e.g., a laser with an external modulator). The light is coupled into a bi-directional optical coupler 424. The bi-directional optical coupler 424 transmits light into a fiber and couples light from this fiber back into a second fiber. The second fiber is coupled to a detector 420. The delay signals from the pattern generator and delay 412 determines the point in time to sample the signal on the detector 420. The sampling is performed with the sampling receiver 416. The sampling receiver 416 samples and holds a signal that represents the amplitude of light power striking the detector 420. The sampling receiver 416 may make a single sample per pulse or may make two samples. Two samples may be used to sample the detector 420 for a baseline measurement of the system noise and a second sample can correspond to the expected time-of-flight of light within the fiber from a distance under measurement. The difference between these two samples can remove system noise from the measurement.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. An optical time domain reflectometer (OTDR) device, comprising:
    a connector guide configured to mate to an attachable fiber optic connector;
    a beam splitter disposed within the connector guide;
    a lens seal coupled to a bottom portion of the connector guide;
    a collimating lens in alignment with the beam splitter and sealed to a bottom portion of the lens seal to prevent external contamination;
    a transparent carrier coupled to a bottom portion of the collimating lens, wherein the transparent carrier has electrical pathways;
    an optical transmitter and optical receiver in alignment with the collimating lens and mounted to an underside of the transparent carrier and connected to the electrical pathways; and
    a transmitting and receiving circuit mounted to the underside of the transparent carrier and connected to the electrical pathways, a transmitter of the transmitting and receiving circuit configured to send a signal to the optical transmitter to cause the optical transmitter to send a pulse of light into an optical fiber of the attachable fiber optic connector, and a receiver of the transmitting and receiving circuit configured to receive a signal from the optical receiver, from a received pulse of light from the optical fiber of the attachable fiber optic connector;
    wherein a time domain reflectometry measurement is determined from a time difference between a sent and received signal.

2. The device of claim 1, wherein the time domain reflectometry measurement is for a plurality of fibers in the attachable fiber optic connector.

3. The device of claim 1, wherein the transmitting and receiving circuit comprises a timing control ASIC and a transceiver ASIC.

4. The device of claim 1, wherein the beam splitter is configured with at least one of a first partially reflective surface of approximately 45 degrees and a second surface that is approximately 100% reflective.

5. The device of claim 1, wherein the transmitting and receiving circuit is flip-chip bonded to the transparent carrier.

6. The device of claim 1, wherein the transparent carrier and lens seal are flip-chip bonded to each other.

7. The device of claim 1, wherein the optical receiver comprises a OTDR receiver and an additional optical receiver.

8. The device of claim 1, wherein an overall height of the device is less than 10 mm.

9. The device of claim 1, wherein the beam splitter, lens seal, collimating lens, transparent carrier, and at least one of the optical transmitter and optical receiver have a matching coefficient of thermal expansion of less than +/−5 ppm/C. deg.

10. The device of claim 1, wherein at least one of the optical transmitter, the optical receiver and the transmitting and receiving circuit is formed on the transparent carrier.

11. The device of claim 1, wherein the optical receiver is a PIN diode, and the optical transmitter is at least one of a diode laser, diode LED and modulated laser.

12. device of claim 1, wherein the transparent carrier is mounted to a substrate having a plurality of electrical wiring, and a portion of the transparent carrier's electrical pathways are in communication with the substrate's electrical wiring.

13. The device of claim 1, wherein the transmitting and receiving circuit further comprises an OTDR timing circuit.

14. The device of claim 11, wherein the optical receiver and optical transmitter are aligned to a desired position on the transparent carrier within a precision of less than 3 microns.

15. The device of claim 12, wherein the substrate is a ceramic carrier substrate.

16. The device of claim 12, wherein the transparent carrier is flip-chip bonded to the substrate.

17. The device of claim 13, wherein at least one of the transmitting and receiving circuit and the OTDR timing circuit is an application specific integrated circuit (ASIC).

18. The device of claim 13, wherein the OTDR timing circuit comprises a clock circuit, a pattern generator and delay circuit, sampling receiver circuit, and a optical transmitter compatible signal driver.

19. The device of claim 18, wherein the sampling receiver circuit is configured to take two samples, one sample accounting for system noise.

20. A method of performing optical time domain reflectometry, comprising:
    generating a clocking signal via a first integrated circuit bonded to a transparent substrate;
    generating a pulse pattern via a second integrated circuit bonded to the transparent substrate;
    transmitting the pulse pattern to a driver bonded to the transparent substrate;
    exciting an optical transmitter bonded to the transparent substrate with the pulse pattern from the driver, to emit light pulses into a bi-directional coupler that couples light into a first fiber and couples light from the first fiber into a second fiber;
    detecting via an optical receiver bonded to the transparent substrate, a received light from the second fiber; and
    sampling the received light and measuring a time difference, via a timing circuit bonded to the transparent substrate, between a sent and received light, to determine a time domain reflectometry measurement.

21. The method of claim 20, wherein the first integrated circuit, second integrated circuit, driver, optical transmitter, optical receiver, and timing circuit are bonded to the transparent substrate via a flip-chip bonding process.

22. The method of claim 20, wherein the sampling is performed at least two times, wherein one sample determines a baseline measurement of system noise.

* * * * *